Patented Apr. 30, 1940

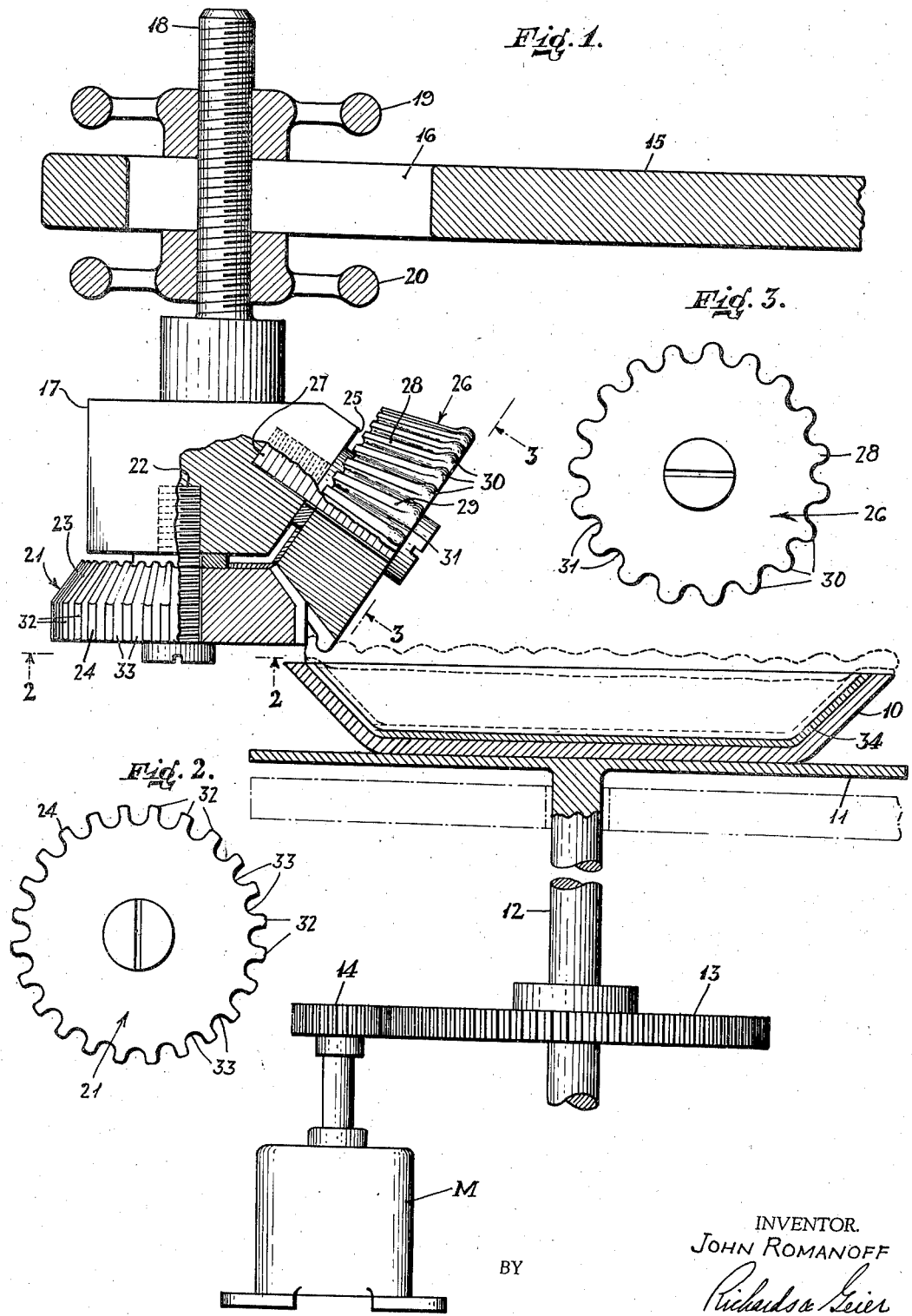

2,198,705

UNITED STATES PATENT OFFICE 2,198,705

PIECRUST CRIMPING DEVICE

John Romanoff, Elizabeth, N. J., assignor to Jones' Pies, Inc., Elizabeth, N. J., a corporation of New Jersey Application July 15, 1939, Serial No. 284,583

5 Claims. (Cl. 107—1)

This invention relates to pie making machines and, more particularly, to a device for crimping the edge around a pie and thereby fastening the top and bottom crusts thereof.

An object of this invention is to provide a piecrust crimping machine which is simple, strong, and durable in construction.

A further object is to provide crimping means which contact the edge of a revolving pie and rotate one another.

A still further object of this invention is to provide crimping means which may be adjusted to crimp the edges of different sized pies.

Another object of the invention is to provide crimping rollers to which the piecrust dough will not adhere.

Other objects of the present invention will become apparent in the course of the following specification.

The above and other objects of the present invention may be realized by providing a revolving pie pan carrier which is adapted to hold a pie pan containing a pie. Above the pie pan carrier is a block mounted on a bracket, so that the block may be longitudinally and vertically adjusted in relation to the pie pan carrier. Crimping means comprising a bevel gear surface and a crimping surface is mounted to turn freely on the bottom of the block. The crimping surface is adapted to engage the side of the piecrust about its periphery. Mounted to turn freely on a side surface of the block, the plane of which is at an obtuse angle to the plane of the surface of the bottom of the block, is a crimping wheel having a bevelled gear surface and a crimping surface, toothed surface being enmeshed with the gear toothed portion of the first-mentioned crimping means. The crimping surface of the second-mentioned crimping wheel engages the top of the piecrust, pressing the same against the crimping roller on the crimping means mounted on the bottom of the block.

The invention will appear more clearly from the following detailed description when taken in connection with the accompanying drawing, showing, by way of example, a preferred embodiment of the invention.

In the drawing:

Figure 1 is a side view, partly broken away, of the piecrust crimping machine of this invention.

Figure 2 is a bottom plan view of one of the crimping gears taken on the line 2—2 of Figure 1.

Figure 3 is a view of another crimping gear taken on the line 3—3 of Figure 1.

Like numerals refer to like parts throughout the several views.

The piecrust crimping machine of this application comprises a pie pan carrier 10 securely fastened to a plate 11 having a rotatable shaft 12. The pie pan carrier is centered above the shaft. The shaft may be rotated by means of a gear 13 driven by a gear 14 on the shaft of a motor M.

Above the pie pan carrier 10 is a bracket 15 having a longitudinal slot 16. Mounted in the slot 16 is a block 17 having a screw-threaded spindle 18 extending through the slot 16 and held in position by means of hand wheels 19 and 20.

A crimping wheel 21 is loosely and freely mounted on the bottom surface of the block 17 by means of a screw 22. The crimping wheel is adapted to run freely in relation to the screw 22. The axis of the crimping wheel 21 and the axis of the rotatable shaft 12 are in parallelism in parallel planes. The top portion of the said crimping wheel has a bevelled gear surface 23 and the side portion has a crimping surface 24. The crimping surface 24 is composed of crimping teeth 32 having rounded surfaces 33 (Figure 2) therebetween, the rounded surfaces communicating with the space between the teeth on the bevelled gear surface 23.

The plane of the side surface 25 of the block 17 is at an obtuse angle to the plane of the bottom surface of said block. The crimping wheel 26 is loosely and freely mounted on the side surface 25 by means of a screw 27, the wheel 26 being mounted to revolve freely about the screw 27. The axis of the gear 26 is in a plane which intersects the planes of the parallel axes of the shaft 12 and gear 21 respectively.

The wheel 26 has a bevelled gear portion 28 which is enmeshed with the bevelled gear surface 23 of the wheel 21. The wheel 26 also has a crimping surface 28 composed of crimping teeth 29 on which there is a protuberance 30. The surface between the teeth 29 is rounded as shown (Figure 3) at 31, and is in communication with the space between the teeth on the bevelled gear portion 28.

In operating the device of this invention, a pie pan 34, containing the ingredients of a pie and having a top crust placed thereon, is securely placed in the pie pan 10. The block 17 is then longitudinally and vertically adjusted by means of the hand wheels 19 and 20, so that the crimping surface 24 of the crimping wheel 21 engages the periphery of the piecrust, and the crimping surface 28 of the crimping wheel 26 engages the top portion of the piecrust at the periphery thereof. The block 17 is so adjusted in relation to the piecrust that a slight pressure is exerted on the top and at the side on the periphery of the same by means of the crimping surrfaces 24 and 28, respectively.

The shaft 12 is then rotated, turning the pan carrier 10 in which the pie pan containing the pie has been placed. The engagement of the piecrust with the crimping surfaces 24 and 28 of the crimping wheels 21 and 26, respectively, rotate the same, since the wheel 26 is mounted freely about the screw 27 and the wheel 21 is adapted to revolve freely on the screw 22. The crimping wheel 21, as it revolves, presses the periphery of the piecrust inwardly and the crimping surface 28 of the crimping wheel 26 presses downwardly on the piecrust which seals the top piecrust to the bottom piecrust.

Since the rounded surface 33, on the wheel 21, between the crimping teeth 32 communicate with the space between the gear teeth on the bevelled gear surface 23 and the rounded surfaces 31, on the wheel 26, communicates with the space between the teeth on the bevelled gear portion 28 any dough from the piecrust which adheres to the rounded surfaces 33 and 31 on the wheels 21 and 26, respectively, will be passed through the rounded surfaces between the teeth on the crimping wheel and the space between the gear teeth on said wheel and out over the top of the crimping wheels.

The plate 11 to which the pie pan carrier is fastened may be mounted on a revolving platform which will deliver the pie pan carrier to such a position that the piecrust engages the crimping wheels 21 and 26. The pie pan carrier is then revolved, turning the crimping wheels 21 and 26 which crimp the piecrust.

It is apparent that the specific illustrations shown have been given by way of illustration and not by way of limitation, and that the structure above described is subject to wide variation and modification without departing from the scope or intent of the invention, all of which variations and modifications are to be included within the scope of the present invention.

What is claimed is:

1. In a piecrust crimping machine a rotatable pie pan carrier, a supporting block, a crimping wheel rotatably mounted on one side of said block said wheel having a toothed crimping surface adapted to engage the periphery of the piecrust and also having gear teeth thereon, and a second crimping wheel rotatably mounted on a side adjacent to said first-mentioned side of the supporting block said second wheel having a toothed crimping surface adapted to engage the top of the piecrust about said periphery, and also having gear teeth thereon enmeshed with the gear teeth on said first-mentioned wheel.

2. In a piecrust crimping machine a rotatable pie pan carrier, a mounting above said pan carrier, a supporting block longitudinally and vertically adjustable in said mounting in relation to said pan carrier, a crimping wheel rotatably mounted on one side of said block said wheel having a toothed crimping surface adapted to engage the periphery of the piecrust and also having gear teeth thereon, and a second crimping wheel rotatably mounted on a side adjacent to said first-mentioned side of the supporting block, said second wheel having a toothed crimping surface adapted to engage the top of the piecrust about said periphery and also having gear teeth thereon enmeshed with the gear teeth on said first-mentioned wheel.

3. In a piecrust crimping machine a rotatable pie pan carrier, a mounting above said pan carrier, a supporting block longitudinally and vertically adjustable in said mounting in relation to said pan carrier, a crimping wheel rotatably mounted on the bottom of said block the axis of rotation of said wheel being in a plane parallel to the plane of the axis of rotation of said pan carrier, the axis of said wheel being parallel to the axis of said pan carrier, said wheel having a toothed crimping surface adapted to engage the periphery of the piecrust and also having gear teeth thereon, and a second crimping wheel rotatably mounted on a side adjacent to said first-mentioned side of the supporting block, the plane of the axis of rotation of said second wheel being at an angle of less than 90° to the plane of the axis of the first-mentioned wheel and intersecting the plane of the axis of the first-mentioned crimping-wheel and the axis of rotation of said pan carrier, said second wheel having teeth about the periphery adapted to engage the gear teeth on said first-mentioned wheel for part of their length and extending the remainder of that length to crimp the edge of the piecrust, said crimping portion being a continuation of the main teeth.

4. In a piecrust crimping machine a rotatable pie pan carrier, a mounting above said pan carrier, a supporting block longitudinally and vertically adjustable in said mounting in relation to said pan carrier, a crimping wheel rotatably mounted on the bottom of said block the axis of rotation of said wheel being in a plane parallel to the plane of the axis of rotation of said pan carrier, the axis of said wheel being parallel to the axis of said pan carrier, said wheel having a toothed crimping surface adapted to engage the periphery of the piecrust and having a rounded surface between the teeth said crimping wheel also having gear teeth thereon, the rounded surfaces between the teeth on said crimping surface communicating with the space between the said gear teeth, and a second crimping wheel rotatably mounted on a side adjacent to said first-mentioned side of the supporting block, the plane of the axis of rotation of said second wheel being at an angle of less than 90° to the plane of the axis of the first-mentioned wheel and intersecting the axis of the first-mentioned crimping wheel and the axis of rotation of said pan carrier, said second wheel having a toothed crimping surface adapted to engage the top of the piecrust about the said periphery and having a rounded surface between the teeth said second-mentioned crimping wheel also having gear teeth thereon enmeshed with the gear teeth on said first-mentioned wheel, the rounded surfaces between the teeth on said crimping surface communicating with the space between the said gear teeth.

5. In a piecrust crimping machine a rotatable pie pan carrier, a mounting above said pan carrier, a supporting block longitudinally and vertically adjustable in said mounting in relation to said pan carrier, a crimping wheel rotatably mounted on the bottom of said block the axis of rotation of said wheel being in a plane parallel to the plane of the axis of rotation of said pan carrier, the axis of said wheel being parallel to the axis of said pan carrier, said wheel having a toothed crimping surface adapted to engage the eriphery of the piecrust and having a rounded surface between the teeth said crimping wheel also having gear teeth thereon the rounded surfaces between the teeth on said crimping surface communicating with the space between the said gear teeth, and a second crimping wheel rotatably mounted on a side adjacent to said first-mentioned side of the supporting block, the plane of the axis of rotation of said second wheel being at an angle of less than 90° to the plane of the axis of the first-mentioned wheel and intersecting the axis of the first-mentioned crimping wheel and the axis of rotation of said pan carrier, said second wheel having a crimping surface comprising a plurality of teeth with a protuberance on the outside end of the top surface of each tooth adapted to engage the top of the piecrust about said periphery and having a rounded surface between the teeth said second-mentioned crimping wheel also having gear teeth thereon enmeshed with the gear teeth on said first-mentioned wheel the rounded surfaces between the teeth on said crimping surface communicating with the space between the said gear teeth.

JOHN ROMANOFF.